Dec. 22, 1925.  
L. B. SWIFT  
1,566,290  
AUTOMATIC CONTROL APPARATUS FOR PROCESSING EQUIPMENT  
Filed March 5, 1924  
4 Sheets-Sheet 1
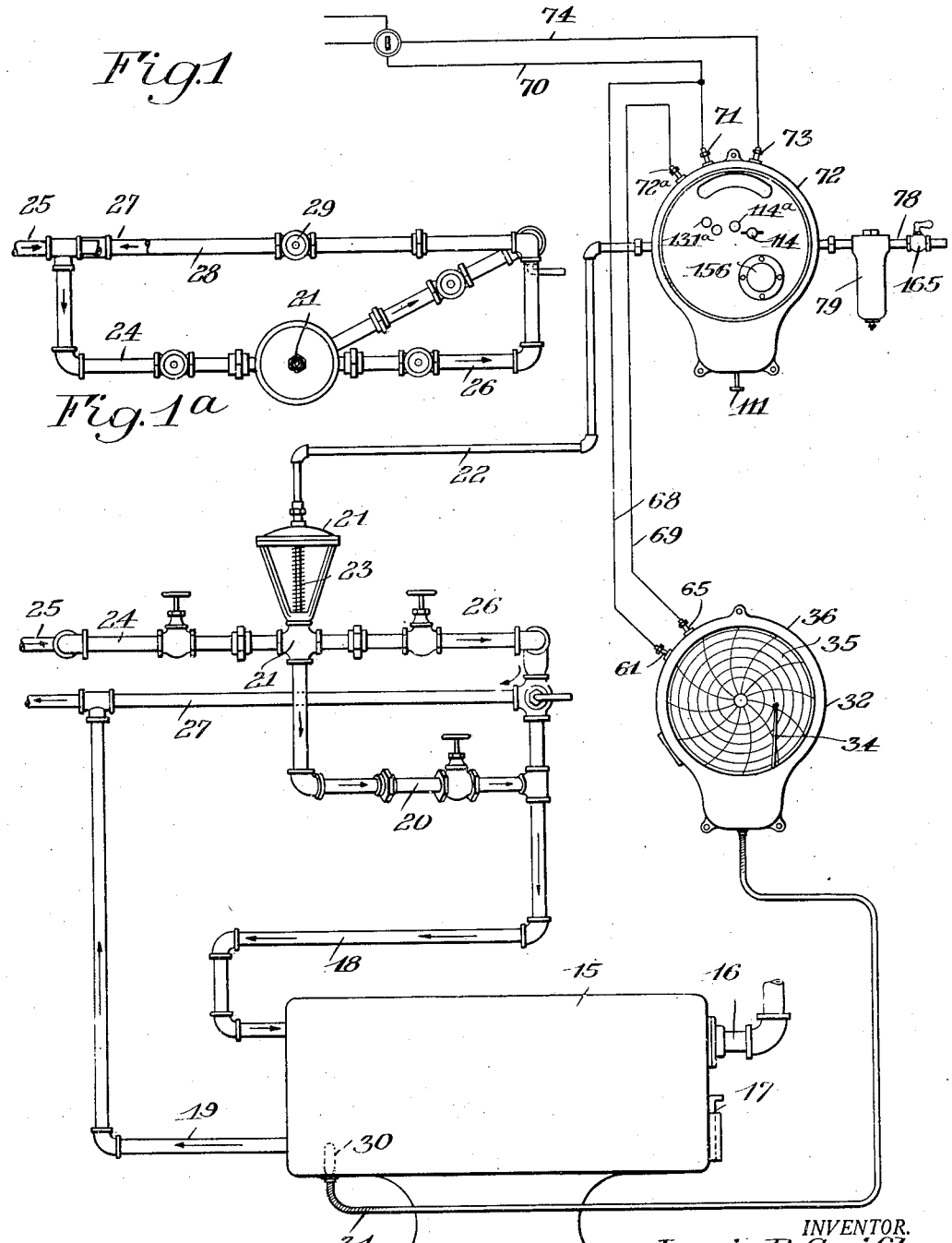

Dec. 22, 1925.
L. B. SWIFT
1,566,290
AUTOMATIC CONTROL APPARATUS FOR PROCESSING EQUIPMENT
Filed March 5, 1924     4 Sheets-Sheet 2
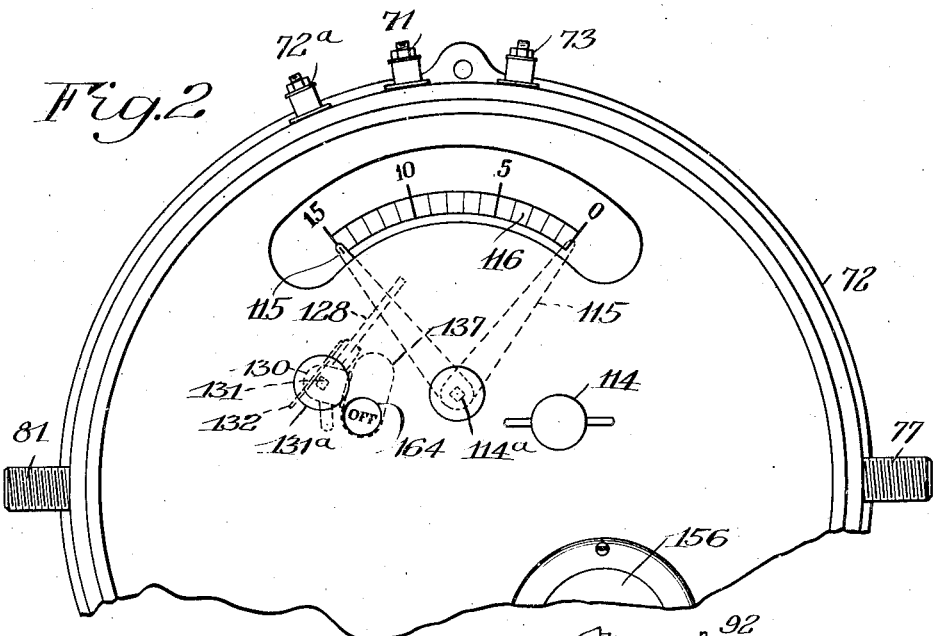
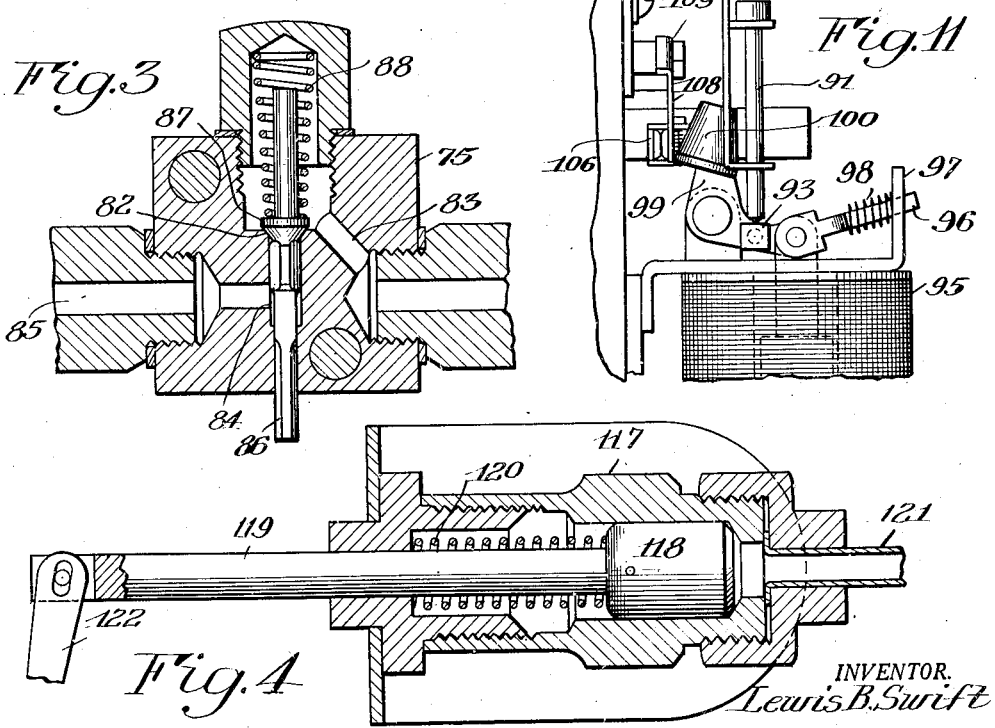

Dec. 22, 1925. 1,566,290
L. B. SWIFT
AUTOMATIC CONTROL APPARATUS FOR PROCESSING EQUIPMENT
Filed March 5, 1924 4 Sheets-Sheet 3

INVENTOR.
Lewis B. Swift
BY
his ATTORNEY

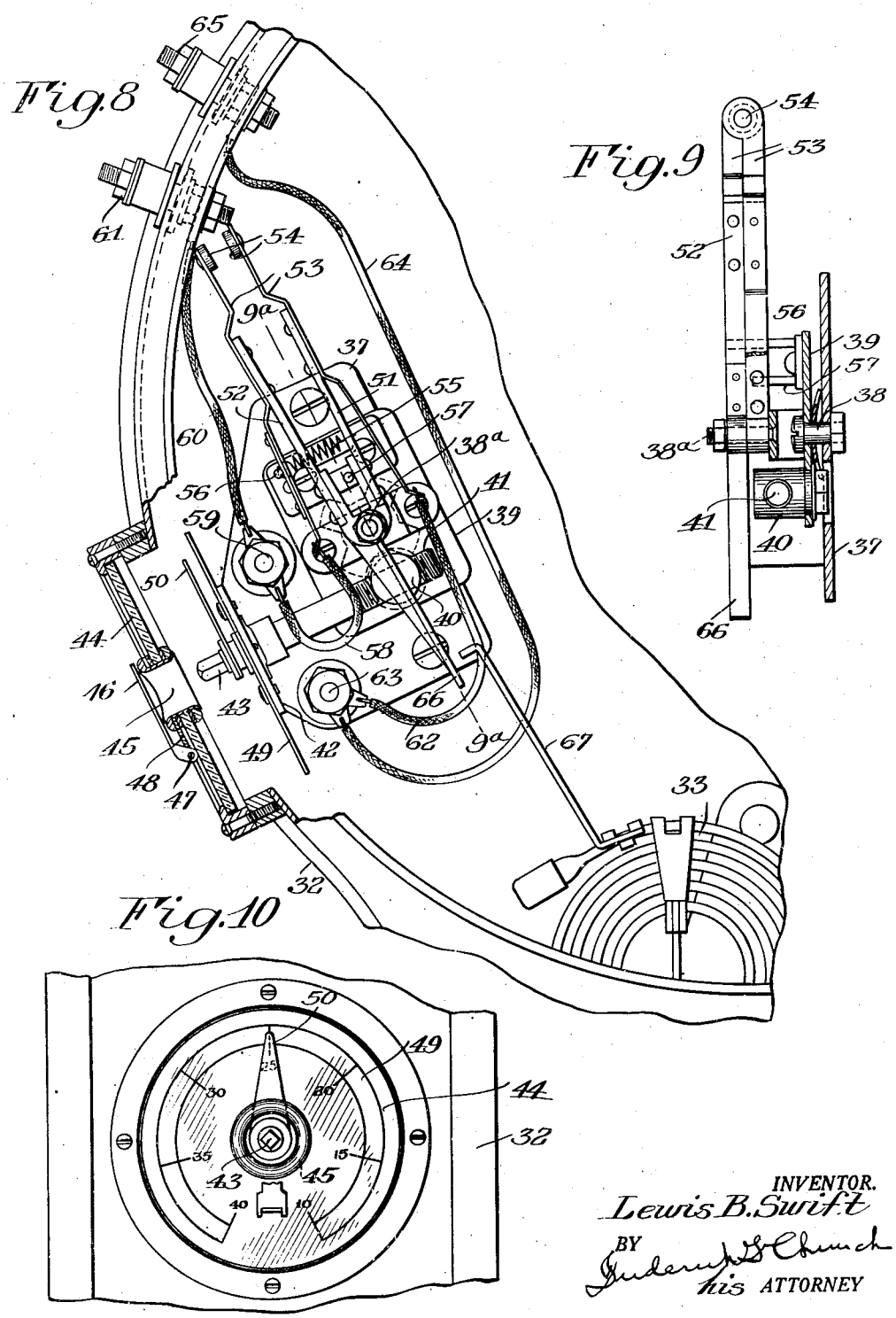

Patented Dec. 22, 1925.

1,566,290

UNITED STATES PATENT OFFICE.

LEWIS B. SWIFT, OF ROCHESTER, NEW YORK, ASSIGNOR TO TAYLOR INSTRUMENT COMPANIES, OF ROCHESTER, NEW YORK, A CORPORATION OF NEW YORK.

AUTOMATIC CONTROL APPARATUS FOR PROCESSING EQUIPMENT.

Application filed March 5, 1924. Serial No. 697,167.

*To all whom it may concern:*

Be it known that I, LEWIS B. SWIFT, a citizen of the United States, residing at Rochester, in the county of Monroe and State of New York, have invented certain new and useful Improvements in Automatic Control Apparatus for Processing Equipment; and I do hereby declare the following to be a full, clear, and exact description of the same, reference being had to the accompanying drawings, forming a part of this specification, and to the reference numerals marked thereon.

This invention relates to the automatic control of processing equipment and more particularly to apparatus for automatically controlling the operation of such equipment as, for example, processing containers requiring the performance of a series of operating steps in timed sequence according to a predetermined schedule, the chief object of the invention being to provide a thoroughly practical and comparatively simple apparatus of this nature adapted to automatically control the operation of a processing container during the major portion of the process, involving, for example, the accurate regulation of operating conditions such as the temperature in the container, through a predetermined time interval and the indication of the termination of such period.

To these and other ends the invention resides in certain improvements and combinations of parts all as will be hereinafter more fully described, the novel features being pointed out in the claims at the end of the specification.

In the drawings:

Fig. 1 is a general view partly diagrammatic of an apparatus embodying the present invention.

Fig. 1ª is a plan view of piping connections.

Fig. 2. is an enlarged fragmentary view of a control mechanism shown in Fig. 1;

Fig. 3 is an enlarged sectional view of a valve means shown also in Fig. 5;

Fig. 4 is a similar view of a fluid pressure operated device shown in Fig. 5;

Fig. 8 is an enlarged elevation, partly in section and partly broken away, illustrating details of a portion of the control mechanism shown in Fig. 1;

Fig. 9 is a sectional view on the line 9ª—9ª in Fig. 8.

Fig. 10 is a fragmentary view of a setting means and dial as seen from the left in Fig. 8, and Fig. 11 shows a solenoid mechanism for actuating certain of the parts.

Similar reference numerals throughout the several views indicate the same parts.

Figure 5:
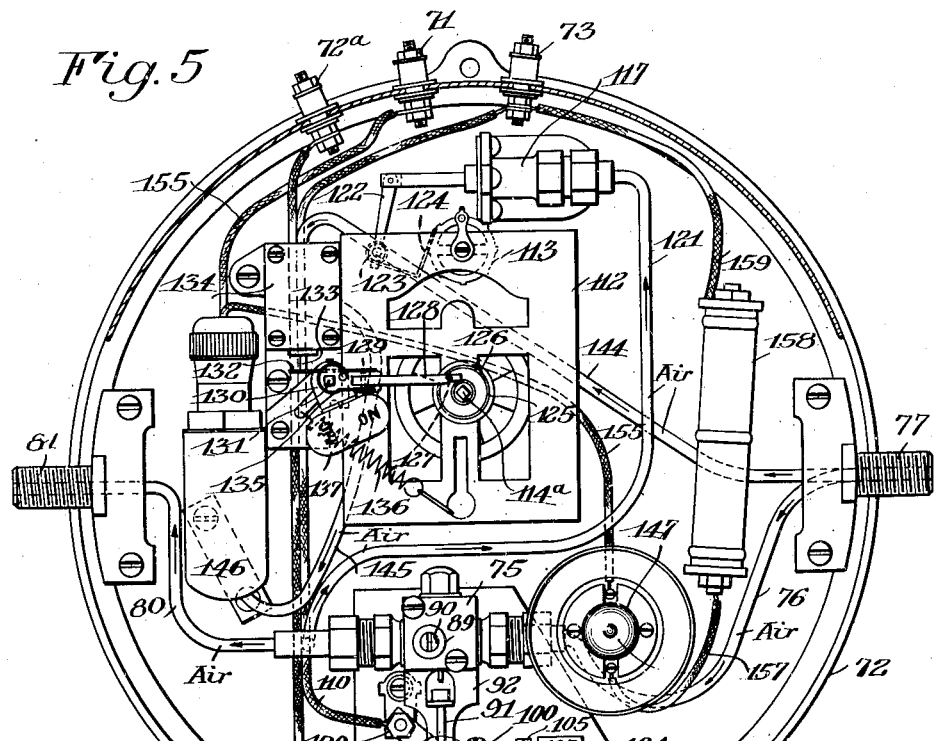
Fig. 5 is an elevation of a control mechanism shown in Figs. 1 and 2 with the casing cover removed.
Figure 6:
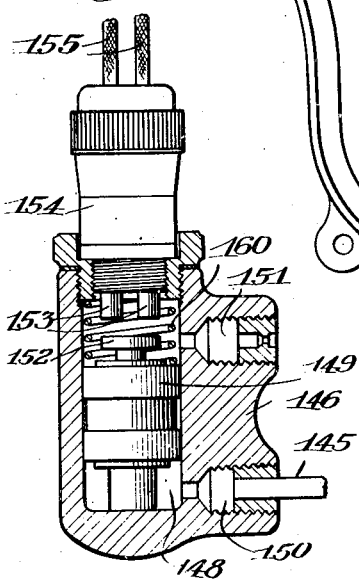
Fig. 6 is an enlarged sectional view of an automatic switch device shown in Fig. 5.

The invention is disclosed herein, by way of illustration, as applied to the control of a processing container equipment, in the present instance an ice cream freezer, requiring periodical filling with the material to be treated and the discharge of same, and simultaneous control of its temperature by the regulation of the supply thereto of a temperature controlling medium such for instance as brine. The present embodiment of the invention provides for the automatic control of those operating steps of the process requiring time consuming attention and accuracy, involving automatic control of the supply of the cooling brine, the timing of the cooling or whipping period and the actuation of a signal indicating the termination of such period, in order that the attendant may then terminate the process. Referring more specifically to the drawings, there is shown at 15, Fig. 1, a freezing container of a form in common use, comprising an inlet connection 16 with a suitable source of supply of the material or mixture to be treated. At 17 is an outlet for discharging the container contents at the end of the process. The container is provided with a cooling coil or jacket, as well understood in the art, supplied with brine through a pipe 18 and discharged through a pipe 19. Supply 18 is connected by a pipe 20 with an automatic three-way valve 21 preferably of the known diaphragm type operated by fluid pressure, supplied through a line 22, and also by a spring 23, as well understood in the art. One branch of this valve is connected by a pipe 24 with a main supply line 25 while the other branch of the valve is connected by a pipe 26 with a pipe 27 serving as a return pipe with which the pipe 19 communicates. A pipe 28 controlled by a hand valve 29 connects supply pipe 25 with return valve 27 and serves as a by-pass for eliminating the automatic control by valve 21 if and when desired. Ordinarily the brine flows from pipe 25 through pipe 24 to valve 21 and under control of the latter either through pipe 20 to the container or through by-pass 26 to return pipe 27. For controlling the temperature of the container a temperature responsive device is employed comprising, in the present instance, a thermometer bulb 30 inserted through the container wall into the mixture and having connected therewith a tube 31 leading to recording instrument 32. The latter comprises a device such as a coiled, flexible tube 33, Fig. 8, of the Bourdon type with which tube 31 communicates. These parts are filled with a fluid expanding with increases in temperature to which the bulb is subjected, such variations in pressure serving to move the free outer end of the tube 33 as well understood in the art. Connected with and actuated by the tube 33 is a temperature recording mechanism of any known or suitable type comprising the usual pen arm 34 swinging over and marking a clock driven chart 35 in a casing 36, for recording the temperature conditions in the container.

Use is advantageously made in the present instance of the recorder mechanism for operating a relay connected with an automatic control mechanism, hereafter described, for controlling the brine supply valve 21 and for operating a signal means, at the proper times. That is to say, each processing cycle is begun by filling the container with a mixture and manually starting the supply of brine to the container for cooling the same. This produces a continuous drop in temperature accompanied eventually by an actuation of the sensitive element 33 of the recorder and when the latter reaches a position corresponding to a predetermined temperature, it actuates the relay described above for operating the control mechanism and through the latter valve 21 to by-pass the brine.

The electrical relay device comprises, preferably, a plate 37, Figs. 8 and 9, fixed on the rear wall of the recorder casing and carrying a post or stud 38 on which is adjustably pivoted a plate 39 on which the operating parts are carried. Plate 39 has a post 40 and a threaded spindle 41 engages a tapped opening in the post, the spindle being rotatably supported in a forwardly extending lug 42 of plate 37. This end of the spindle is squared as at 43 for engagement by a key inserted through a central opening in a glass window 44 in the side of the casing.

Window 44 preferably has its opening finished with a metal sleeve 45 as shown and normally closed by a cover 46 pivoted at 47 on an arm 48 carried by sleeve 45. The window opening is thus normally rendered dust proof by means avoiding interfering with the vision. Lug 42 carries a dial 49, Fig. 10, graduated in degrees of temperature, and cooperating with the dial is a pointer 50 fixed on the spindle end 43. The spindle may thus be readily rotated by means of a key to set the pointer for a desired temperature and this adjusts plate 39 to effect operation at such temperature, as hereafter described.

Pivotally supported on a post 38ª carried by plate 39 are a pair of contact arms 51 and 52. The outer ends of these arms are preferably of insulating material to which are fixed conducting strips 53 having contact points 54. A spring 55 fixed to arm 51 and to a post 56 holds this arm against a stop 57. Arm 52, however, swings freely on its pivot in such a position that it is normally swung by gravity to carry its strips 53 against post 56 with the contacts 54 in spaced relation. The strip 53 of arm 52 is connected by conductor 58 with a binding post 59 connected by a conductor 60 with an external binding post 61 of the casing. The strip 53 of arm 51 is connected by a conductor 62 with a binding post 63 connected by a conductor 64 with an external binding post 65 in the casing wall, and by this means an external relay circuit may be connected to include the contacts 54. An extension 66 of arm 52 projects into the path of movement of an arm 67 fixed to the moving end of the temperature responsive element or coil 33 so that the contracting movement of this element, as the temperature falls eventually causes its arm 67 to engage and swing arm 52 to close contacts 54 and thus complete the relay circuit. Such closing of the circuit occurs at the temperature of the container for which pointer 50 is set as above described.

The relay thus operated by the recorder mechanism comprises conductors 68 and 69 attached to the binding posts 61 and 65 respectively. Conductor 68 is connected with one side 70 of an electrical supply line leading to a binding post 71 on the control mechanism which latter is indicated generally at 72. The other relay conductor 69 leads to a binding post 72ª on the controller casing. The latter carries also a binding post 73 with which the other side 74 of the supply line is connected.

The control mechanism proper, 72, is of a unitary character within a casing generally similar to that of the recorder 32 as shown, and these two instruments are adapted to be located at some distance from the freezer equipment if so desired. The control mechanism as best shown in Fig. 5 comprises a fluid pressure or secondary air valve 75 supplied with pressure through a line 76 leading to a nipple 77 in the side of the casing with which is connected a line 78 leading to a source of compressed air at 79 is a trap. The outlet side of valve 75 is connected by a pipe 80 with a nipple 81 in the casing with which is connected a pipe 22 leading to the automatic brine valve 21, so that this secondary valve controls the alternate supply and by-passing of the brine. Its construction is shown in Fig. 3 as comprising a seat 82 with one side of which communicates a port 83 with which the supply line 76 is connected. Communicating with the other side of the seat is a bore 84 and communicating with this is a port 85 with which the outlet pipe 80 connects. Sliding in bore 84 is a valve stem 86 operating a valve 87 normally urged toward its seat by a spring 88. At 89, Fig. 5, is a nipple communicating with the outlet port of the valve and fitted with a plug having a small vent opening 90 for relieving pressure in this line. Valve stem 86 is operated to unseat the valve to transmit pressure by the engagement therewith of a plunger 91 sliding in suitable bearings in a bracket 92, in alignment with the valve stem. The lower end of the plunger is positioned for engagement by a lug 93 connected with the vertically reciprocating armature of a solenoid 95. This solenoid device preferably comprises a detent arm 96 pivoted at one end to the armature and sliding at the other in a post 97, compression spring 98 being carried between the post and an abutment of the arm to serve as an overthrow device yieldably retaining the armature in either the raised or lowered position to which it may be moved. Pivotally connected with the armature also is a rocking lever 99 one arm of which carries the abutment 93 while the other carries a switch actuating head 100 of insulating material. Solenoid 95 is connected at one end as shown by a conductor 101 with binding post 72. The other terminal is connected by a conductor 102 with a binding post 103 and by the conducting strip 104 with the pivot 105 of a switch arm 106. A spring 107 normally swings the arm to engage a switch arm 108 connected with a binding post 109 and by a conductor 110 with binding post 73. It is apparent from these connections that when the relay circuit is closed by the recorder at the desired freezing temperature, solenoid 95 is energized to raise armature 94 which operates to unseat valve 82 and at the same time to disengage switch arms 106 and 108 thereby breaking the circuit to the solenoid. The retaining device however holds the armature elevated and valve 82 unseated. Pressure is thus transmitted to operate valve 21 to by-pass the brine, the container being then allowed to stand at the predetermined temperature which it holds substantially constant by reason of the insulated container construction commonly employed. At the end of the process the solenoid is reset in initial or inactive position by pulling down a handle 111 connected with the lower end of the armature and extending through an opening in the bottom of the instrument casing. Such lowering of the armature of course, permits closing of switch arms 106 and 108 preparatory to the next operation of the solenoid.

The period for which the material is subjected to the freezing temperature is automatically measured by a clock mechanism forming a part of the controller and indicated generally at 112. Such mechanism may have any known or suitable construction, comprising preferably the usual balance wheel 113 and a winding stem 114, Fig. 2. This clock mechanism is initially set to operate for the desired whipping period by turning a stem 114ª to set the pointer 115 fixed thereon in registry with the desired number of minutes of the period as shown on a dial 116. At the end of such period the controller operates a signal means, as hereafter described. The clock mechanism, having thus been set for the desired period, is started automatically upon the attainment of the whipping temperature by means which will now be described.

The clock starting device comprises a cylinder 117 best shown in Fig. 4 in which slides a piston 118 on a stem 119. The piston is urged toward one end of the cylinder by a compression spring 120 while the opposite end of the cylinder has connected therewith a pipe 121 branching from the outlet of valve 75. At the same time therefore that the latter is operated by the solenoid to operate valve 21 to by-pass the brine, piston 118 is moved toward the left and retained in such position so long as the solenoid armature remains elevated. The piston stem 119 has pivotally connected therewith a lever 122 pivotally supported at 123 and comprising a resilient finger 124. The latter is adapted to engage and hold the escapement wheel 113 of the clock, but when piston 118 is actuated by air pressure as described, finger 124 is swung away from the escapement wheel and serves to thus start the clock.

The means for automatically operating a signal at the end of the whipping period comprises preferably a ring 125 carried by the clock setting stem 114ª, the ring having at one point an opening 126. Cooperating with this ring is a pin 127 fixed in the end of an arm 128. The latter is pivoted at 129 to swing horizontally on a head 130 fixed on a post 131 rotatably supported in any suitable manner on the instrument casing and having a knob 131ª at its outer end, as shown for pivotally adjusting the same. This head carries also in addition to arm 128, a spring finger 132 arranged to engage and raise the stem 133 of a valve 134 hereafter described. Arm 128 is spring actuated toward ring 125 to engage its pin 128 inside the ring, as by means of a leaf spring 135. The pin 127, or the outer edge of ring 125, or both, are preferably bevelled so that as the arm is swung downwardly by turning post 131, arm 128 swings first outwardly on the head when its pin 127 engages the ring and then inwardly to engage the pin within the ring by which it is retained until the rotation of the ring by the clock brings the ring opening 126 over the pin which is thereupon released. When the pin is engaged within the ring as just described, finger 132 is in position to raise the stem of valve 134. Arm 128 however is swung, when released by the ring, to carry finger 132 away from the valve stem, by a tension spring 136 connected to the head 130 and to the casing. The head carries a suitable dial 137 in this instance marked with the words "On" and "Off," one of which is visible through an opening in the instrument casing in each position of the head to indicate the same.

Figure 7:
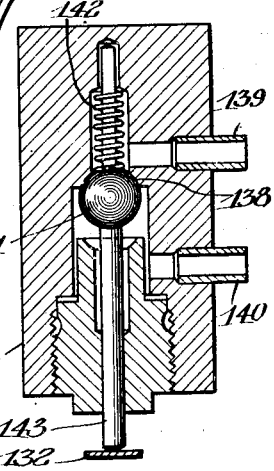
Fig. 7 is a similar view of a fluid pressure valve shown in Fig. 5.

Valve 134 thus operated at the end of a predetermined period, is shown in detail in Fig. 7 as comprising a seat 138 between an inlet air port 139 and outlet port 140. A valve body 141 is urged away from its seat by a spring 142, the valve body having a stem 143 projecting downwardly for engagement by the finger 132 previously described. Valve inlet 139 is connected by a pipe 144 with the supply nipple 77 in the casing wall while its outlet 140 is connected by a conductor 145 with an automatic switch 146 for operating an electric signal such for example as a suitable lamp 147, the lighting of which signals the attendant that the desired whipping period has expired.

The automatic switch for operating the signal lamp comprises a cylinder 148 in which slides a piston 149 between an inlet port 150 connected with pipe 145 and a vent port 151. The piston carries a bridging contact 152 adapted to connect a pair of insulated contacts 153 in a plug 154 screwed into the cylinder casing, the plug contacts being connected by conductors 155, the one with binding post 71 on the instrument casing and the other with the signal lamp 147 supported on the rear wall of the instrument casing and showing through a glass window 156 in its front cover. The other lamp terminal is connected by a conductor 157 with a resistance element 158 and the latter is connected by a conductor 159 with binding post 73, so that the switch and lamp are in a series with each other across the supply circuit 70—74. A compression spring 160 in the cylinder tends to maintain the piston contact 152 separated from the contacts 153 to open the switch. The application of fluid pressure to the other end of the cylinder, however, through pipe 145, as described, serves to move the piston against the spring to close the switch. Such supply of fluid pressure is effected as already stated by the release and opening of secondary valve 134 by the release of arm 128 by the clock mechanism at the end of the whipping period.

In operation, the spindle 43 of the recorder 32 is key set to register pointer 50 with the temperature indication on dial 49 corresponding to the temperature down to which it is desired to cool the mixture. This adjusts the extension 66, Fig. 8, to position for actuation by the arm 67 of the temperature responsive element of the recorder to close contact 54 of the relay circuit at the selected temperature. The clock mechanism is wound by turning stem 114, Fig. 2. The clock pointer 115 is set by stem 114ª to the number of minutes on dial 116 corresponding to the whipping period. Knob 131ª is turned toward the right to engage arm 128 with the ring 125 of the clock as described, in which position the word "On" appears at the opening 164. Handle 111, Fig. 5, is pulled down to lower the armature and effect the closing of valve 75. Fluid pressure is supplied to the control mechanism through pipe 78, Fig. 1, as by turning the pet cock 165. The container discharge valve 17 being closed and the container having been filled with the mixture to be frozen, the process is started by manually turning on the supply of brine to valve 21 which at this time is open and permits the brine to flow through the freezer coils, thus starting the process cycle.

The mixture in the container is cooled by the continued circulation of brine until its temperature is reduced to the predetermined whipping point. When this is reached, the corresponding reduction of pressure in the temperature responsive element 33 permits the latter to contract, as well understood in the art, close the relay contacts 54 and thus energize solenoid 95 of the controller 72. The armature of the latter is raised thereby to open valve 75 and admit compressed air to the brine control valve 21 which by-passes the brine. At the same time, the opening of valve 75 transmits air pressure to cylinder 117 and operates the clock starting device to effect timing of the whipping period. When the clock has operated for the number of minutes to which pointer 115 has been initially set and the pointer thus returned to zero, opening 126 in the retaining ring 125 of the clock registers with and releases arm 128. The latter and the head 130 carrying the same, together with the spindle 132, are thrown by spring 136 to the position shown in Fig. 2, releasing valve 141, Fig. 7, which is moved by its spring to open position transmitting air pressure to the automatic switch 146. This closes the switch which connects the signal lamp 147 across the electrical supply line, lighting the lamp to signal to the attendant that the whipping period has been completed. The brine supply line is then closed by a hand valve, air pressure is shut off from the controller by closing pet cock 165, and the cooled mixture discharged from the freezer by opening valve 17. The processing cycle is then repeated with a new batch of the mixture, as already described. The invention thus provides a practical and comparatively simple mechanism for automatically controlling the processing equipment during the major portion of the process cycle in a manner affording greater accuracy of control as well as economy of time and labor. The control mechanism is conveniently set to predetermined temperatures and time periods, and while herein disclosed as applied to a cooling process, it is obviously applicable as well to a heating process, as well as to other processes and equipment.

I claim as my invention:

1. In apparatus of the character described, a container, means for supplying thereto a medium for controlling the temperature therein, time control mechanism provided with means for starting the same, signal means operated by said mechanism, a sensitive device responsive to the temperature in said container and connected with said starting means for actuating the same at a predetermined temperature in said container, and mechanism for automatically operating said supply means coincidently with the starting of said time control mechanism.

2. In apparatus of the character described, a container, means for supplying thereto a medium for controlling the temperature therein, time control mechanism provided with means for starting the same, signal means operated by said mechanism, a sensitive device responsive to the temperature in said container and actuating connections between said sensitive device and starting means and supply means for operating the same at a predetermined temperature in said container.

3. In apparatus of the character described, a container, means for supplying thereto a medium for controlling the temperature therein, time control mechanism provided with means for starting the same, signal means operated by said mechanism, a sensitive device responsive to the temperature in said container, recording means governed by said device, and relay mechanism comprising motor means connecting said device with said supply means and starting means for operating the same at a predetermined temperature in said container.

4. In apparatus of the character described, a container, a conducting system for supplying a temperature controlling medium to said container, a fluid pressure operated valve governing said system, pressure conducting means for said valve governed by a secondary valve, time control mechanism having fluid pressure operated means for starting and stopping the same connected with said pressure conducting means, signal means operated by said time mechanism, a temperature responsive device, subjected to the temperature of said container, and actuating means connecting said device with said secondary valve for operating the same at a predetermined container temperature.

5. In apparatus of the character described, a container, means for supplying thereto a medium for controlling the temperature therein, time control mechanism provided with means for starting the same, signal means operated by said mechanism, a sensitive device responsive to the temperature in said container and electrical means including a solenoid connecting said device with said supply means and starting means for operating the same at a predetermined temperature in said container.

6. In apparatus of the character described, a container, means for supplying thereto a medium for controlling the temperature therein, time control mechanism adapted to be set for different control periods and provided with means for starting and stopping the same, an electric signal lamp and a switch governing the same, fluid pressure means for actuating said switch arranged for operation by said time mechanism at the end of a control period, a sensitive device responsive to the temperature in said container, and actuating means connecting said device with said supply means and with said starting and stopping means for operating the same at a predetermined temperature in said container.

7. In apparatus of the character described, a container, means for supplying thereto a medium for controlling the temperature therein, time control mechanism provided with means for selectively setting the same for different control periods, signal means operated by said mechanism at the end of a selected period, a sensitive device, adjustably responsive to the temperature in said container, and apparatus actuated by said device upon attainment of a predetermined temperature for automatically operating said supply means and starting the operation of said time mechanism.

8. In apparatus of the character described, a container, means for supplying thereto a medium for controlling the temperature therein, signal means, a time control mechanism adapted to be selectively set for operation through different control periods and provided with means for operating said signal means at the end of said periods, motor means for operating said supply means, and starting said time mechanism arranged for manual movement to an initial inactive position, a sensitive device responsive to the temperature in said container, and an actuating connection between said device and motor means for effecting active movement thereof at a predetermined temperature in said container.

9. In apparatus of the character described, a processing container, means for supplying a temperature controlling medium thereto, a pressure operated main valve governing said supply means, an electric signal lamp and a switch governing the same, fluid pressure means for actuating said switch having a secondary valve, time control mechanism adapted to be selectively set to operate for different control periods and provided with means for operating said secondary valve at the end of said periods, fluid pressure means for starting said time mechanism, pressure conducting means for operating said main valve and starting means including an auxiliary control valve, a solenoid for operating said auxiliary valve and a sensitive device subjected and responsive to the temperature in said container for operating said solenoid.

LEWIS B. SWIFT.